US006616963B1

(12) United States Patent
Zerby et al.

(10) Patent No.: US 6,616,963 B1
(45) Date of Patent: *Sep. 9, 2003

(54) LAMINATED CANDY PRODUCTS MADE BY AN EXTRUSION PROCESS

(75) Inventors: Christine Zerby, Marengo, OH (US); Ronald Paul Duffell MacDonald, Marysville, OH (US); Brian Makela, Dublin, OH (US)

(73) Assignee: Nestec S.A., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/712,265

(22) Filed: Nov. 15, 2000

(51) Int. Cl.[7] ................................................. A23G 3/06
(52) U.S. Cl. ...................... 426/660; 426/571; 426/572; 426/659; 426/306; 426/516; 426/517
(58) Field of Search ................................ 426/660, 571, 426/572, 659, 516, 517, 306

(56) References Cited

U.S. PATENT DOCUMENTS

| | | |
|---|---|---|
| 1,566,329 A | 12/1925 | Laskey |
| 1,951,694 A | 3/1934 | Goulstone .................... 226/100 |
| 2,478,075 A | 8/1949 | Baker ............................ 107/1 |
| 2,742,000 A | 4/1956 | Hansen et al. ................. 107/27 |
| 3,213,808 A | 10/1965 | Schafer ......................... 107/1 |
| 3,554,137 A | 1/1971 | Carre et al. ..................... 107/4 |
| 3,702,254 A | 11/1972 | Cassanelli et al. ............. 99/139 |
| 3,821,452 A | 6/1974 | Hayashi ....................... 426/502 |
| 3,851,084 A | 11/1974 | Rossen et al. ................ 426/343 |
| 3,940,226 A | 2/1976 | Verhoeven ................... 425/375 |
| 3,968,267 A | 7/1976 | Ogasa et al. ................. 426/570 |
| 4,027,047 A | 5/1977 | Harima ........................ 426/383 |
| 4,054,271 A | 10/1977 | Lanzillo ........................ 366/70 |
| 4,113,819 A | 9/1978 | Hayashi et al. .............. 264/173 |
| 4,279,932 A | 7/1981 | Koshida et al. ................ 426/89 |
| 4,289,790 A | 9/1981 | Bruelle ......................... 426/93 |
| 4,305,965 A | 12/1981 | Cheney ....................... 426/104 |
| 4,357,359 A | 11/1982 | Cloud et al. ................. 426/103 |
| 4,391,832 A | 7/1983 | Haas, Sr. et al. ............ 426/275 |
| 4,416,910 A | 11/1983 | Hayashi et al. .............. 426/502 |
| 4,449,906 A | 5/1984 | Sienkiewicz et al. .... 425/131.1 |
| 4,536,147 A | 8/1985 | Groff .......................... 425/323 |
| 4,542,028 A | 9/1985 | Butcher et al. .............. 426/100 |
| 4,563,358 A | 1/1986 | Mercer et al. ................. 426/89 |
| 4,563,363 A | 1/1986 | Yoon .......................... 426/303 |
| 4,647,467 A | 3/1987 | Pinto .......................... 426/502 |
| 4,648,316 A | 3/1987 | Ruffinatti ..................... 99/483 |
| 4,648,821 A | 3/1987 | Thulin ..................... 425/133.1 |
| 4,651,635 A | 3/1987 | Ally ............................ 99/450 |
| 4,679,496 A | 7/1987 | Simelunas et al. ............ 99/450 |
| 4,715,803 A | 12/1987 | Koppa ..................... 425/133.1 |
| 4,732,770 A | 3/1988 | Welygan et al. ............... 426/94 |
| 4,778,685 A | 10/1988 | Simelunas et al. .......... 426/297 |
| 4,781,929 A | 11/1988 | Hoashi ......................... 426/92 |
| 4,793,786 A | 12/1988 | Greenhouse et al. ..... 425/131.1 |
| 4,821,634 A | 4/1989 | Swanson .................... 99/450.2 |
| 4,822,627 A | 4/1989 | Clegg et al. ................. 426/101 |
| 4,828,854 A | 5/1989 | Beer .......................... 426/104 |
| 4,847,090 A | 7/1989 | Della Posta et al. ......... 424/440 |
| 4,851,247 A | 7/1989 | Greenhouse et al. ........ 426/250 |
| 4,858,524 A | 8/1989 | Simelunas et al. ......... 99/450.2 |
| 4,878,425 A | 11/1989 | Butcher et al. ............. 99/450.2 |
| 4,888,187 A | 12/1989 | Given, Jr. et al. .......... 426/102 |
| 4,894,002 A | 1/1990 | Groff .......................... 425/319 |
| 4,911,937 A | 3/1990 | Crosello et al. ............. 426/103 |
| 4,913,645 A | 4/1990 | Daouse et al. .............. 425/150 |
| 4,923,706 A | 5/1990 | Binley et al. ................ 426/516 |
| 4,932,317 A | 6/1990 | Hoormann ................. 99/450.2 |
| 4,949,630 A | 8/1990 | Knebl .......................... 99/450 |
| 5,000,969 A | 3/1991 | Beer .......................... 426/101 |
| 5,035,905 A | 7/1991 | Knebl ........................ 426/284 |
| 5,073,389 A | 12/1991 | Weinecke .................... 426/103 |
| 5,087,464 A | 2/1992 | Eberhardt et al. ........... 426/231 |
| 5,126,157 A | 6/1992 | Burwell et al. .............. 426/515 |
| 5,194,283 A | 3/1993 | Dupas et al. ................ 426/582 |
| 5,437,879 A | 8/1995 | Kabse et al. ..................... 426/5 |
| 5,500,234 A | 3/1996 | Russo ......................... 426/103 |
| 5,603,965 A | 2/1997 | Daouse ........................ 425/130 |
| 5,686,128 A | 11/1997 | Tracy et al. ................. 426/284 |
| 5,723,164 A | 3/1998 | Morano ....................... 426/572 |
| 5,731,020 A | 3/1998 | Russo ......................... 426/104 |
| 5,792,500 A | 8/1998 | Housset et al. .............. 426/582 |
| 5,843,350 A | 12/1998 | Maeda et al. ............... 264/40.5 |
| 6,054,166 A | 4/2000 | Dupart ........................ 426/549 |
| 6,183,799 B1 | 2/2001 | Wu et al. .................... 416/516 |

FOREIGN PATENT DOCUMENTS

| | | |
|---|---|---|
| CA | 2187940 | 4/1997 |
| CN | 87104646 | 1/1988 |
| DE | 2426569 | 12/1975 |
| DE | 2314826 | 4/1978 |
| DE | 3423727 | 1/1986 |
| DE | 3436578 | 1/1986 |
| DE | 29815302 | 12/1998 |
| EP | 530313 A1 | 11/1993 |
| EP | 0 653 285 | 11/1994 |
| EP | 0808576 | 11/1997 |
| EP | 0 848 910 A2 | 6/1998 |
| EP | 0 848 910 A3 | 3/2000 |
| FR | 2484376 | 12/1981 |
| GB | 2 018 562 | 10/1979 |
| GB | 2 084 115 | 4/1982 |
| GB | 2 130 866 | 6/1984 |
| GB | 2 283 699 | 5/1995 |
| JP | 61265048 | 11/1986 |
| JP | 61293336 | 12/1986 |
| JP | 62022555 | 1/1987 |
| JP | 62061544 | 3/1987 |
| JP | 62257347 | 11/1987 |
| JP | 63068039 | 3/1988 |
| JP | 63301749 | 12/1988 |
| JP | 1153044 | 6/1989 |
| JP | 1232963 | 9/1989 |

(List continued on next page.)

Primary Examiner—Nina Bhat
(74) Attorney, Agent, or Firm—Winston & Strawn

(57) ABSTRACT

The invention relates to novel edible laminated structures that have at least one first fluid material interleaved between thin layers of a second fluid material wherein neither of the first fluid material nor the second fluid material is a hard candy mass.

22 Claims, No Drawings

FOREIGN PATENT DOCUMENTS

| | | |
|---|---|---|
| JP | 8009887 | 1/1996 |
| JP | 8010313 | 1/1996 |
| JP | 11056278 | 3/1999 |
| JP | 11299422 | 11/1999 |
| SU | 459206 | 4/1975 |
| SU | 516390 | 6/1976 |
| SU | 591173 | 1/1978 |
| SU | 591174 | 1/1978 |
| SU | 1533630 | 1/1990 |
| WO | WO 94/02027 | 2/1994 |
| WO | WO 97066941 | 2/1997 |
| WO | WO 9725874 | 7/1997 |
| WO | WO 00/60959 | 10/2000 |

LAMINATED CANDY PRODUCTS MADE BY AN EXTRUSION PROCESS

TECHNICAL FIELD

The present invention relates to extruded candy products having a laminated structure with a desired texture.

BACKGROUND ART

In view of the large amount of candy consumed by consumers, there is always an interest in providing new, different, and unusual candies. A popular type of candy are laminated candy products. These candy products consist of many layers of alternating materials. The texture of the candy product is a result of the laminated structure and the materials used to form the laminated structure. Typically, laminated candy products consist of layers of hard candy and a fatty paste or fluid such as peanut butter which is then coated with chocolate or other coating. A candy product with a laminated structure of hard candy and a fatty paste or fluid generally has a crunchy texture.

The conventional process for producing a laminated product of hard candy and a fatty paste or fluid product involves heating candy syrup in a precooker to form a candy mass and boiling the resulting candy mass to produce a viscous material having a low moisture content. Typically the moisture content is about 4–5%. The resulting boiled candy mass is discharged from the cooker and passed through an aeration screw to aerate the candy mass. The aerated candy mass is then placed on a steel tempering band which cools the candy mass to a specified temperature such that the candy mass remains pliable. The aerated candy mass is then sheeted and the candy sheet is coated with a layer of fatty paste. The layer of fatty paste and aerated candy may be sprinkled with rework prepared from reusable products from previous candy bar forming operations. Alternatively, the candy sheet can be sprinkled with rework before it is coated with the fatty paste or the candy sheet can be coated with a mixture of fatty paste and rework. The layer of candy mass and fatty paste is then rolled onto itself to give a thicker candy mass with more layers. The plastic mass is then sheeted and cut into individual bars. The whole system is continuous. The resulting candy bar centers can be coated with chocolate or other coatings to produce the final candy product. An example of this process is disclosed in U.S. Pat. Nos. 4,679,496, 4,778,685 and 4,858,524. Due to the rolling it is only possible to prepare laminated candy products wherein one of the materials is a hard candy. If one of the materials is not a hard candy mass the two materials would simply flow together when they are rolled and a laminated structure would not be obtained.

U.S. Pat. No. 5,437,879 discloses a multi-layered chewing gum gel cream confection. The multi-layered chewing gum comprises at least two separate layers of a chewing gum composition and at least one layer of a hydrophilic confectionery gel creme sandwiched between the at least two separate layers of a chewing gum composition.

U.S. Pat. No. 4,911,937 discloses a chewable, peelable nougat candy comprising at least two layers of nougat wherein each layer of nougat is separable from the adjacent nougat layer by the interposition of a compound coating.

UK Patent Application No. 2 283 699 discloses a method of coextruding multi-layered food products. The food products may be jam, truffle, fondant, caramel, toffee, blancmange, marshmallow, aerated chocolate, batter, fat creams, pumpable pastes, and pumpable sauces. The food products are coextruded through different channels arranged placed side by side one after the other to define a column of channels.

U.S. Pat. No. 4,542,028 discloses a composite frozen confection comprising a multiplicity of superimposed extruded layers of extrudable confectionery material. Thin layers of a second confectionery material such as a fat based confection material are interleaved between layers of a frozen aerated confectionery such as ice cream.

U.S. Pat. No. 4,651,635 discloses an apparatus for making multi-layered folded pastries.

U.S. Pat. No. 5,500,234 discloses a crispy multi-layered cookie or sandwich like product wherein intermediate filler material may be used between the outer crispy or cookie layers without degradation of the crispiness of the outer layers.

Canadian Patent Application No. 2,187,940 discloses a multilayer dessert comprising at least one heat treated component of mousse, creme, jelly, and/or sauce that is coated with a continuous sterilized layer of fat coating or chocolate.

There is a need, however, for new laminated candy products that have unique texture and mouth feel and provide a unique eating sensation.

SUMMARY OF THE INVENTION

The present invention relates to a laminated edible product comprising a plurality of strips layered upon each other, wherein each strip comprises at least one first fluid material interleaved between at least two layers of a second, different fluid material which completely surrounds the first fluid material, wherein the second fluid material flows at one temperature but solidifies at a lower temperature and neither the first fluid material nor the second fluid material is a hard candy mass. In one embodiment at least some of the strips comprise a single first fluid material encased within a second fluid material. The first fluid material in the strip may have a variable thickness.

In another embodiment a plurality of first fluid materials are provided between the layers of second fluid material. The plurality of strips may be layered upon each other to form the product and, in one embodiment, the strips may be layered upon each other at an angle to form the edible product.

The second fluid material may solidify at a temperature of less than about 30° C. The first and second fluid materials may be a fat based confectionery coating or a sugar based confectionery paste. In one embodiment the second fluid material is a fat based confectionery coating. The second fluid material may be a chocolate. The first fluid material may be a jelly, nougat, fondant, nut paste, chocolate paste, fat cream, caramel, fudge, flour based paste, cookie dough, marshmallow, or a liquid.

In the laminated edible product of the invention the first fluid material or the second fluid material may include one or more inclusions. The inclusions may be cereals; grains; nuts; pieces of fruit; jelly pieces; pieces of wafers, cookies, or biscuits; candy pieces, or mixtures thereof. The dimensions of the pieces may be from about 0.02 inches to 0.250 inches. The first fluid material or the second fluid material may also include one or more colorings or flavorings.

The laminated edible may also include a coating that surrounds or covers the laminated structure. The coating may be a chocolate or a fudge. The coating may be covered with one or more toppings, such as one or more of sprinkles; nuts; cereals; grains; pieces of fruit; jelly pieces; pieces of wafers, cookies, or biscuits; and candy pieces.

In yet another embodiment the laminated edible product includes a plurality of first fluid materials, wherein one of the first fluid materials is layered on top of another first fluid material to form a multi-layered strip of first fluid materials, which strip is encased with the second fluid material layers.

The thickness of the strips in the laminated edible product may be between about 1/100 inch and 1/8 inch and about 2 to 500 strips maybe superimposed to form the product. The layer of superimposed strips may have a thickness of between about 0.01 inches to 4 inch.

DETAILED DESCRIPTION OF THE PREFERRED EMBODIMENTS

The present invention is directed to a laminated edible product wherein a strip of at least one first fluid material encased in a layer of a second fluid material is layered on top of itself. The laminated edible product consists of many thin layers of alternating materials, wherein neither material is a hard candy mass.

By "strip" is meant one or more fluid materials that are simultaneously discharged from a coaxial die to form a product stream wherein one or more first fluid materials is encased between a second fluid material. Preferably, the one or more first fluid materials is completely surrounded by the second fluid material. The second fluid material completely surrounding the first fluid material(s) is accomplished by using a coaxial die with two or more concentric oval shaped exit ports, wherein the inner exit ports discharge the one or more first fluid material(s) and the outer exit port discharges the second fluid material. By having the second fluid material completely surround the first fluid material advantageously improves the integrity of the laminated structure by reducing the ability of the first fluid material to ooze or flow out of the laminated structure. Indeed, by having the second fluid material completely surround the first fluid material it is possible to make laminated structures with materials that previously could not be combined to form a laminated structure.

In the laminated edible product of the invention the first fluid material and the second fluid are either a fat based confectionery coating or a sugar based confectionery paste. Preferably, the first fluid material and the second fluid material are different. More preferably, the first and second fluid material are visually or texturally distinguishable. Preferably, the second fluid material is a fluid at one temperature and a solid at a lower temperature. Preferably, the second fluid material is a solid at a temperature of less than about 30° C. In the laminated edible products the laminated structure is maintained in the final product preferably without having to refrigerate the final product. Furthermore, it is unnecessary to form the laminated structure in a cup or other container or to keep the final laminated product in a cup or other container to maintain the laminated shape. Preferably, the layers of the laminated structure are not separable.

By "fat based confectionery coating" is meant a chocolate or a compound coating.

The term "chocolate," as used herein means any confectionary product having qualities sufficient to impart chocolate taste and character. Suitable chocolates include, but are not limited to, sweet chocolate, milk chocolate, buttermilk chocolate, bittersweet chocolate and chocolates as defined in 21 C.F.R. §163. Chocolate also includes other materials, such as compound coatings, that have a chocolate flavor and perform as a chocolate analogue or a chocolate substitute.

The term "compound coating," as used herein means any confectionary product based on vegetable fat. In addition to vegetable fat the confectionary coatings typically contain sugar; flavorings such as cocoa solids, peanut solids, and other natural or artificial flavors; emulsifiers; coloring agents; and optionally milk solids. As noted above, some compound coatings closely resemble true chocolate, dark or milk. Other compound coatings, made from cocoa powder, non-fat milk powder, sugar, and one of the many vegetable fats, may have an appearance resembling dark or milk chocolate, but a texture that is quite different. Compound coatings also include pastel coatings, which have no cocoa powder and have added colors and flavors. The compound coating can have a variety of flavors including, but not limited to, maple, chocolate, vanilla, peanut butter, and butterscotch.

By "sugar based confectionery paste" is meant a sugar based candy that has a higher moisture content than a hard candy. Typically, the moisture content of a sugar based confectionery is more than about 7 percent, preferably more than about 10 percent. Sugar based confectionery pastes do not include cookies and cakes.

By "hard candy mass" is meant any hard candy product having a moisture content of about 3 to 5 percent by weight and which is produced by methods known to those of ordinary skill in the art.

Several examples of materials that can be combined to provide a laminated structure are provided below. In one embodiment the first (second) fluid material is a chocolate or compound coating and the second (first) fluid material is a jelly, nougat, fondant, nut paste, coconut paste, chocolate paste, fat cream or melt-away, caramel, fudge, flour based paste, cookie dough substitute, marshmallow, or a liquid. Preferably, the second fluid material is a chocolate or compound coating.

The term "jelly" as used herein means a sugar and starch based composition having a gummy texture. Typically jellies include pectin. A representative jelly recipe is to combine about 35.5 parts water, about 1.65 parts pectin, about 48.5 parts sugar, about 29.5 parts glucose syrup, about 0.75 parts 50% citric acid solution, and coloring and flavoring and then to boil the resulting mixture until a final solids content of about 75 percent is obtained.

The term "fondant," as used herein means a composition based on sugar, glucose syrup, and possibly invert sugar that has a creamy texture. A representative fondant recipe is to combine about 8 lbs sugar, about 2.2 lbs glucose syrup, and about 2.8 lbs water to provide a mixture and to then cook the mixture at about 240 to 250° C., preferably about 248° C. to a solids content of about 80 to 90 percent, preferably about 88 percent.

The term "nougat," as used herein is a composition, similar to a fondant in that it is based on sugar, but further comprises whipped eggs for a lighter texture, the mixture being whipped to a frappe. A representative fondant recipe is to dissolve about 0.25 lbs egg albumen in about 31 lbs water and add about 51 lbs icing sugar to provide a mixture and beat the mixture at high speed with a wire wisk to provide a whip. Separately, about 13 lbs sugar is dissolved in about 41 lbs of water followed by about 20 lbs of glucose syrup and the mixture boiled at about 260° C. to provide a syrup. The syrup is then added in thin streams to the whip with continuous whipping at low speed with a flat beater. Optionally, one or more of cocoa powder (about 2 lbs), malt powder (about 2 lbs), nonfat milk powder (about 1.5 lbs), or icing sugar (about 1.5 lbs) may be added and gradually stirred into the mixture of whip and syrup. Fat (about 11 lbs) is then melted at low temperature and added to the mixture with slow mixing for the minimum amount of time needed to disperse the fat. The resulting mixture can then be pumped while hot and cooled as part of the laminated mass.

The term "nut paste," as used herein means ground or chopped nuts that are made into a paste. Any type of nuts may be used including, but not limited to, almonds (marzipan), pecans, hazelnuts, walnuts, and peanuts.

The term "coconut paste," as used herein means a cream made of either toasted or fresh coconut.

The term "fat cream" or "melt-away," as used herein means a fat based cream. The term "cream," as used herein means a base for a fondant comprised of sugar, glucose, and invert sugar. Adding fat to the base provides a "fat cream." Typically, the fat content of the fat cream or melt-away is from about 15 to 35 percent, preferably from about 20 to 30 percent, and more preferably from about 24 to 27 percent. Optionally, colors and flavors may be added to the fat cream.

The term "caramel," as used herein means a caramelized sugar optionally containing milk and/or butter to provide a soft, medium, or hard texture. A representative caramel recipe is to combine about 6.5 lbs water, about 10 lbs white granulated sugar, about 10 lbs brown sugar, about 17 lbs glucose, about 18 lbs full fattened sweetened condensed milk, about 8 lbs hardened vegetable fat, about 8 oz glyceryl monostearate, and about 5 oz salt to provide a mixture and to then boil the mixture to the desired moisture content to provide a soft, medium, or hard caramel. A soft caramel is typically prepared by cooking at a temperature of about 245 to 248° F. to a water content of about 9 to 10 percent. A medium caramel is typically prepared by cooking at a temperature of about 250 to 255° F. to a water content of about 7 to 8 percent. A hard caramel is typically prepared by cooking at a temperature of about 262 to 267° F. to a water content of about 5 to 6 percent.

The term "fudge," as used herein means a caramel with the sugar being in the crystalline state and having a grainy and short texture. The recipe for a fudge is the same as the recipe for a caramel except that a fondant is added to the caramel to seed and initiate a crystallization process of the caramel. Crystallization can also be initiated by agitation of the caramel while cooling. Crystallization involves the formation of sugar crystals during cooling, which can be regulated and controlled to obtain the desired size of crystals and is important in determining the textural characteristic of the final fudge product. The flavor and texture of the fudge are determined by the degree of boiling of the original caramel base and the amount of the fondant added to the grain the mass.

The term "liquid," as used herein can be any type of flowable liquid such as a cordial or fruit juice.

The term "flour based paste," as used herein means a paste, comprised of flour, sugar, oil, and water. Any type of flour can be used including, but not limited to, wheat, oat, rice, and soy flour. Any type of oil can be used including, but not limited to, coconut oil, peanut oil, vegetable oil, and coconut oil.

The term "cookie dough substitute," as used herein means a shelf stable, dairy free, egg free dough that resembles a regular cookie dough, but does not have to be refrigerated or baked. The term "shelf stable," as used herein means the product does not require any refrigeration and can be stored at room temperature with substantially no spoilage or microbiological growth.

Preferably, the first and second fluid materials do not include flour. When the first or second fluid material does contain flour, however, the product does not require cooking before being eaten and is shelf stable. Thus, the products of the invention are completely different from flour based confectionery products such as dough containing products that require cooking and are not shelf stable. Furthermore, the products of the invention are unlike dough containing products in that the products of the invention do not include flour in combination with eggs.

The term "marshmallow," as used herein is a sugar based, egg whipped, aerated confection well known to those of ordinary skill in the art.

Recipes for preparing a jelly, nougat, fondant, nut paste, coconut paste, chocolate paste, fat cream or melt-away, caramel, fudge, flour based paste, cookie dough substitute, marshmallow, or a liquid are well known to those of ordinary skill in the art and need not be further described herein (See, e.g., "Chocolate, Cocoa, and Confectionery Science and Technology," $3^{rd}$ ed., Bernard W. Minifie, Aspen Publishing (1999)).

The first or second fluid material may also include one or more flavorings or colorings. Any flavoring or coloring can be used. The flavoring or coloring can be natural or artificial. One or ordinary skill in the art would readily be able to select suitable colorings or flavorings without undue experimentation.

The first or second fluid material may optionally contain one or more inclusions. Any type of inclusion can be used including, but not limited to, cereals and grains, similar to breakfast cereal but smaller in size, including oats, puffed rice, and puffed wheat; nuts that are either whole, chopped, or ground; pieces of fruit; jelly pieces; pieces of wafers, cookies, or biscuits; candy pieces such as morsels of butterscotch, chocolate, hard candy, and gummies. Typically, the pieces have dimensions that are from about 0.02 inches to 0.250 inches, preferably 0.4 inches to 0.175 inches, more preferably from about 0.06 ($\frac{1}{16}$) inch to 0.125 ($\frac{1}{8}$) inch. The inclusions may be combined with the fluid material either before or after it is extruded. In another embodiment the strip may be extruded directly onto inclusions that are layered on a belt or the inclusions may be sprinkled on top of the strip after it is extruded.

The laminated structure may be prepared by successively layering the strip on top of itself. The strip may be layered on top of itself, for example, by the method disclosed in U.S. patent application Ser. No. 09/320,567, the contents of which are expressly incorporated herein by reference hereto. Alternatively, the laminated structure can be prepared by aligning a plurality of coaxial dies parallel to each other and perpendicular to the movement of a conveyor belt and extruding the first and second fluid materials through each coaxial die onto the conveyor belt so that the extruded mass laminates on itself. In this embodiment of forming the laminated structure it is possible to form a laminated structure that is distorted and does not have a regular shape and provides a novel appearance. Preferably, the plurality of coaxial dies comprises from about 2 to 7 coaxial dies and more preferably from about 3 to 5 coaxial dies.

The thickness of the strips can be varied by varying the distance between the coaxial die assembly and the conveyor belt and potentially by oscillating the die. The thickness of the strips may be from about $\frac{1}{100}$ inch to $\frac{1}{8}$ inch. Preferably, the thickness of the strips is from about $\frac{1}{50}$ inch to $\frac{1}{10}$ inch and more preferably about $\frac{1}{20}$ inch to $\frac{1}{10}$ inch. In addition, the thickness of the resulting stack (i.e., the number of layers of center-filled strips) can also be varied. The number of strips in the stack may vary from about 2 strips to 500 strips. Preferably the number of strips in the stack varies from about 10 strips to 300 strips, more preferably from about 20 strips to 100 strips. As explained herein, each strip comprises three layers, i.e., at least one first fluid material encased in a layer of a second fluid material. The thickness of the stack may vary from about 1/100 inch to 4 inches. Preferably the thickness of the stack is from about 0.375 inches to 1 inch. The texture of the laminated structure is determined, in part, by the number of layers and the thickness of the layers.

When extruding a first fluid material encased in a second fluid material wherein neither of the fluid materials is a liquid or plastic candy mass the first and second fluid materials may be at the same temperature or a different temperatures. For example, if the first fluid material is a sugar based confectionery paste and the second fluid material is a compound coating the first fluid material may be cooler than the second fluid material so that the first fluid material cools the second fluid material so that the second fluid material sets and assures the integrity of the laminated structure. The temperature difference between the first fluid material and the second fluid material is product specific and can vary over a wide range depending on the characteristics of the first fluid material and the second fluid material. The temperature difference can be in excess of 220° F. Typically, the temperature difference is less than about 50° F. For example if a sugar based paste and a compound coating are laminated the sugar based paste is typically at a temperature of from about 55 to 60° F. and the compound coating is at a temperature of from about 95 to 100° F. A higher temperature for one of the fluid materials may be need so that the material can be extruded. If the temperature difference is too large, however, the materials may mix or run together (this can happen for example when the first and second fluid materials are a chocolate and a nut paste) or there may be a decrease in viscosity that causes thinner layers to be formed. One or ordinary skill in the art can readily determine the temperature of the first and second fluid materials without undue experimentation.

According to the invention the at least one first fluid material can be a mixture of two or more first fluid materials. In another embodiment the two or more first fluid materials are not extruded as a mixture but are extruded so that each of the first fluid materials are layered on top of the other first fluid material(s) to form a multi-layered strip of first fluid materials encased in the second fluid material. In yet another embodiment of the invention the at least one first fluid material is more than one fluid material that is extruded to form a single layer of first fluid materials encased in the second fluid material and wherein each first fluid material is adjacent to another first fluid material. One of ordinary skill in the art would readily know how to modify the coaxial die assembly so as to produce multi-layered first fluid materials or to produce a single layer of first fluid materials wherein first fluid materials are adjacent to each other.

The novel laminated structures prepared by the process of the invention have a unique appearance. For example, each layer of the laminated structure may be a different color. For example, the laminated structure might comprise a mint fondant and a dark chocolate to provide a "zebra stripe" appearance. Moreover, since the laminated structures comprise materials that previously could not be laminated, the laminated structures have a unique texture and mouthfeel.

The resulting laminated structure may be further enrobed or covered with a coating. The coating may be, for example, a chocolate, a fudge, and the like. In addition, the coating may be further covered with one or more toppings. Representative toppings include, but are not limited to sprinkles, crushed nuts, and any of the inclusions listed above. The term "enrobing," as used herein means that the laminated structure is completely surrounded by the coating. For example, the laminated candy mass may be enrobed by dipping the laminated structure in a liquified coating. The term "covered," as used herein means that the laminated structure is covered by the coating. For example, the laminated candy mass may be covered by pouring a liquified coating over the laminated structure.

EXAMPLES

The invention is further defined by reference to the following examples describing in detail the products of the present invention. The examples are representative, and should not be construed to limit the scope of the invention in any way.

Example 1

Laminated Chocolate and Caramel Candy Bar

A laminated chocolate and caramel candy can be prepared by coextruding a chocolate at a temperature of about 95° .F and a caramel at a temperature of about 110° F. The resulting laminated structure is run through bar slitters to make centers and the resulting centers can be enrobed in chocolate to make a final bar.

What is claimed is:

1. A laminated edible candy product comprising a plurality of strips layered upon each other, wherein each strip comprises at least one first fluid material interleaved between at least two layers of a second, different fluid material which comprises a fat-based confectionery coating and which completely surrounds the first fluid material to form the laminated edible candy product, wherein the second fluid material that flows at one temperature but solidifies at a lower temperature and neither the first fluid material nor the second fluid material is a hard candy mass.

2. The laminated edible product of claim 1, wherein at least some of the strips comprise a single first fluid material encased within a second fluid material.

3. The laminated edible product of claim 1, wherein the first fluid material has a variable thickness.

4. The laminated edible product of claim 1, wherein a plurality of first fluid materials are provided between layers of the second fluid material.

5. The laminated edible product of claim 1, wherein the strips are layered upon each other at an angle.

6. The laminated edible product of claim 1, wherein the second fluid material solidifies at a temperature of about 30° C.

7. The laminated edible product of claim 1, wherein the first and second fluid materials are a fat based confectionery coating or a sugar based confectionery paste, or a combination thereof.

8. The laminated edible product of claim 7, wherein the second fluid material is a fat based confectionery coating.

9. The laminated edible product of claim 8, wherein the second fluid material is a chocolate or compound coating.

10. The laminated edible product of claim 1, wherein the first fluid material is a jelly, nougat, fondant, nut paste, chocolate paste, fat cream, caramel, fudge, flour based paste, cookie dough, or a liquid.

11. The laminated edible product of claim 1, wherein the first fluid material or the second fluid material further comprise one or more inclusions.

12. The laminated edible product of claim 11, wherein the inclusions are selected from the group consisting of cereals;

grains; nuts; pieces of fruit; jelly pieces; pieces of wafers, cookies, or biscuits; and candy pieces, and mixtures thereof.

13. The laminated edible product of claim 11, wherein the pieces have dimensions that are from about 0.02 inches to 0.250 inches.

14. The laminated edible product of claim 1, wherein the first fluid material or the second fluid material further comprises one or more colorings or flavorings.

15. The laminated edible product of claim 1, further comprising a coating that surrounds or covers the laminated structure.

16. The laminated edible product of claim 15, wherein the coating is a chocolate or a fudge.

17. The laminated edible product of claim 15, wherein the coating is covered with one or more toppings.

18. The laminated edible product of claim 17, wherein the topping is selected from the group consisting of sprinkles; nuts; cereals; grains; pieces of fruit; jelly pieces; pieces of wafers, cookies, or biscuits; and candy pieces; and any combination thereof.

19. The laminated edible product of claim 1, comprising a plurality of first fluid material, wherein one of the first fluid materials is layered on top of another first fluid material to form a multi-layered strip of first fluid materials, which strip is encased with the second fluid material layers.

20. The laminated edible product of claim 1, wherein the thickness of the strips is from about $\frac{1}{100}$ inch to $\frac{1}{8}$ inch.

21. The laminated edible product of claim 1, wherein about 2 to 500 strips are superimposed to form the product.

22. The laminated edible product of claim 1, wherein the layer of superimposed strips has a thickness of about 0.01 to 4 inches.

* * * * *

UNITED STATES PATENT AND TRADEMARK OFFICE
CERTIFICATE OF CORRECTION

PATENT NO. : 6,616,963 B1
DATED : September 9, 2003
INVENTOR(S) : Zerby et al.

It is certified that error appears in the above-identified patent and that said Letters Patent is hereby corrected as shown below:

<u>Title Page,</u>
Item [56], References Cited, FOREIGN PATENT DOCUMENTS, change "WO 97066941" to -- WO 9706691 --.

Signed and Sealed this

Tenth Day of February, 2004

JON W. DUDAS
*Acting Director of the United States Patent and Trademark Office*